United States Patent
Belloso

(10) Patent No.: US 7,057,500 B1
(45) Date of Patent: Jun. 6, 2006

(54) REAR VIEW MONITORING SYSTEM FOR MOTOR VEHICLES

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 201 days.

(21) Appl. No.: 10/830,077

(22) Filed: Apr. 23, 2004

(51) Int. Cl.
  *B60Q 1/00* (2006.01)
(52) U.S. Cl. .................. 340/435; 340/425.5; 340/436; 340/903
(58) Field of Classification Search ............... 340/435, 340/425.5, 436, 903, 517, 521, 522, 525; 348/148; 701/301
See application file for complete search history.

(56) References Cited

U.S. PATENT DOCUMENTS

| | | | |
|---|---|---|---|
| 4,277,804 A | 7/1981 | Robison | |
| 5,949,331 A * | 9/1999 | Schofield et al. | ........... 340/461 |
| 6,222,447 B1 * | 4/2001 | Schofield et al. | ........... 340/461 |
| 6,424,273 B1 | 7/2002 | Gutta et al. | |
| 6,509,832 B1 * | 1/2003 | Bauer et al. | ............. 340/425.5 |
| 6,672,745 B1 * | 1/2004 | Bauer et al. | ................ 362/545 |
| 6,891,563 B1 * | 5/2005 | Schofield et al. | ........... 348/148 |

* cited by examiner

*Primary Examiner*—Toan N. Pham
(74) *Attorney, Agent, or Firm*—Norman B. Rainer

(57) ABSTRACT

A rear view monitoring system for motor vehicles employs three video assemblies, two of which view regions rearwardly at opposite sides of the vehicle, and the third views the region directly rearwardly of the vehicle. Each assembly has an optical lens which gathers light at a particular viewing angle to produce a focused image, and a camera body which converts the image to an electronic signal capable of adjustment and transmission by electrical conductors. The assemblies also have provision for reversing the image to a mirror-image format. The mirror images are of substantially equal magnification and are displayed on screens mounted within the vehicle at positions generally associated with conventional rear view mirrors.

12 Claims, 9 Drawing Sheets

REAR VIEW MONITORING SYSTEM FOR MOTOR VEHICLES

BACKGROUND OF THE INVENTION

1. Field of the Invention

This invention relates to devices used to visually monitor the areas alongside and behind a motor vehicle while the vehicle is in operation.

2. Description of the Prior Art

It is necessary for a person operating a motor vehicle to be aware of other vehicles or other objects beside or behind his vehicle. Currently this is done through the use of rear view mirrors. Usually there is a rear view mirror inside the vehicle, centered high on the windshield to visualize the road behind the vehicle through the rear window. In addition, there is usually a mirror outside the door window on each side, to visualize the area beside and behind the vehicle.

Said rear view mirrors have several shortcomings. Firstly they each have a narrow field of vision so that they leave blind spots, particularly to the left rear and to the right rear of the vehicle. Such blindspots make it necessary for the driver to turn his head rearwards before he can change lanes or make appropriate maneuvers, thus diverting his attention from the area ahead of the vehicle. Features such as the roof-supporting pillars of the vehicle, head rests, and even passengers obstruct the view, so that even when the driver turns his head backwards, he still may not have a complete view of areas in the blind spots. Such obstructions are worse in delivery vans, trucks and buses.

The problems with the blind spots are especially severe with big trucks with "cab over engine" design where the outside rear view mirrors are necessarily placed at a high position, causing the driver to be unable to see low-silhouette vehicles alongside his vehicle. A system that will provide a rear view from a lower vantage point would go far towards solving this problem.

Yet another problem with outside rear view mirrors is that deposits of ice, snow or condensed moisture on the window adjacent to the mirror will obscure the driver's view of the mirror. Sometimes the exterior mirrors themselves become covered with occluding deposits such as condensed moisture, snow rain or dirt, thereby diminishing their effectiveness.

Because current outside rear view mirrors protrude outwardly from the otherwise smooth contour of the external surface of the vehicle, they detract from the vehicle's appearance and streamlined efficiency. It is not possible to reduce the size of this protuberance as long as its function relies on the use of mirrors which must necessarily be of adequate size.

There is also no way to adjust the brightness or contrast of the image seen in conventional rear view mirrors. What it reflects is what the driver sees, whether it is too dark or too glaring.

Currently some vehicles, especially towing trucks, are equipped with special video monitoring devices to visualize the towing hitch to assist the operator in maneuvering the vehicle for hitching it to the trailer. These video monitors are not, however, satisfactory for supplanting or complementing the rear view mirrors and do not solve the problems enumerated above. For one thing, a video camera facing backwards gives a regular direct view of the observed area, whereas a standard rear view mirror provides a "mirror image" of the observed area.

This difference is crucially important from the functional point of view because objects seen on one side of the mirror (when viewed through a standard rear view mirror) will appear on the opposite side of the viewing screen when seen through a rearward facing video monitor lens. The average driver, trained to react quickly to the mirror images presented by the standard rear view mirrors, will then tend to react with the wrong maneuver upon seeing these "turned around" direct images on the video screen. A better approach would be a system which would show a "mirror image" on the video screen just like the ones shown by the standard rear view mirrors. A driver could then use this system just as easily as he uses standard rear view mirrors. Furthermore, he would enjoy other advantages as discussed below.

In motor vehicles, whether automobiles or trucks, the driver's seat is positioned adjacent either the left or right side door and associated window. For example, in the United States the driver is adjacent the left door, and in England and other countries, the driver sits adjacent the right door. Accordingly, the driver is never seated equidistantly between the rear view side mirrors located outside the vehicle and adjacent the windows of the doors. As a consequence of the uneven spacing between the driver's head and the left or right side mirror, the driver's viewing angle is greater with respect to the closest mirror than the more distant mirror.

In order to cause the more distant mirror to provide the same effective field of view as the closer mirror, the more distant mirror is caused to have an outwardly convex curvature, which widens its viewing angle. However, the widened viewing angle causes objects seen in the mirror to appear smaller than they should be. This creates the psychological impression that such objects are further away than they really are, particularly in comparison with the image in the closer mirror, and such distorted impression can produce driving accidents. In fact, all such convex mirrors bear the message "Objects in mirror are closer than they appear."

In a related issue concerning the location of the driver's eyes relative to the rear view mirrors, it is to be noted that, when drivers of different heights drive the same vehicle on different occasions, the angular position of all three mirrors must be adjusted. Although this is merely an inconvenience prior to travel in the vehicle, there could be serious consequences if such mirror re-adjustment is forgotten.

U.S. Pat. No. 4,277,804 to Robison discloses the use of a mirror in association with a television camera to provide a mirror image view of the area behind a trailer truck. The mirror image is viewable on a screen adjacent the driver of the truck. Robison's system cannot be readily adapted to monitor areas at the sides of the truck.

U.S. Pat. No. 6,424,273 to Gutta et. al. discloses a vision system for an automobile employing paired television cameras protruding from opposite sides of the automobile forwardly of the driver, and a rearwardly directed third camera. The images provided by the cameras are displayed as a composite image in a single image display device located in front of the driver. This sytem would tend to be confusing to the average driver who would, by force of habit, automatically look to the direction of the left and right outside rear view mirrors to check the traffic situation in the left and right adjacent lanes.

It is accordingly an object of the present invention to provide a rear view monitoring system for use in motor vehicles for achieving improved observation of areas alongside and behind the vehicle, including areas generally referred to as "blind spots."

A further object of this invention is to provide a monitoring system as in the foregoing object which provides a display of equal sized mirror images of observed areas on both sides of the vehicle.

An additional object of this invention is to provide a monitoring system that will, firstly, provide an image of the areas to the right and rear of the vehicle on a viewing screen located at or near the place where the conventional right rear view mirror is usually located; secondly, that will provide an image of the areas behind and to the left of the vehicle on a viewing screen located at or near the place where the conventional left rear view mirror is usually located; and, thirdly, that will provide an image of the areas directly behind the vehicle on a viewing screen located behind the upper middle portion of the windshield where the conventional inside rear view mirror is usually located, so that the ordinary driver will not need to change his regular viewing habits when checking for traffic in these corresponding areas.

It is another object of the present invention to provide a monitoring system of the aforesaid nature that is unaffected by occluding deposits on the vehicle's windows.

A still further object of this invention is to provide a monitoring system of the aforesaid nature which produces images that can be adjusted with respect to contrast and brightness.

Still another object of the present invention is to provide a rear view monitoring system whose components are substantially non-protrusive from the external surface of the vehicle, thereby enhancing the vehicle's appearance and streamlined contour.

These objects and other objects and advantages of the invention will be apparent from the following description.

SUMMARY OF THE INVENTION

The above and other beneficial objects and advantages are accomplished in accordance with the present invention by a rear view monitoring system for a motor vehicle having a longitudinal center axis and passenger compartment symmetrically centered upon said axis and bounded in part by front and rear, left side and right side portions of the vehicle, a front windshield, a roof, and upwardly directed roof-supporting pillars, said monitoring system comprising:
a) first and second rear view side video assemblies installable on opposite sides of the front portion of said vehicle and positioned and configured to produce mirror images of rearward areas contiguous to the left and right sides of the vehicle, respectively,
b) a third video assembly installable at the rear of said vehicle and configured to produce a mirror image of an area behind said vehicle, and
c) monitor screens located within said compartment and separately interactive with each video assembly to provide visually observable pictures corresponding to said mirror images, the screens associated with said first and second video assemblies being positioned adjacent pillars on the same side of the compartment as the associated video assembly, and the screen associated with said third video assembly being centered high upon said front windshield.

Said first and second side video assemblies may be installed as far forward in the vehicle as practicable in order to achieve widened effective field of view. In the case of large trucks, said side video assemblies are preferably located in a relatively low position in order to ensure visualization of low silhouette vehicles alongside said truck.

The monitor screens are positioned in the approximate locations the driver would glance toward by habit when checking for conventional mirror-provided images of traffic at the sides or rear of the vehicle. Said monitor screens may be equipped with brightness and contrast controls located at places convenient to the driver.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
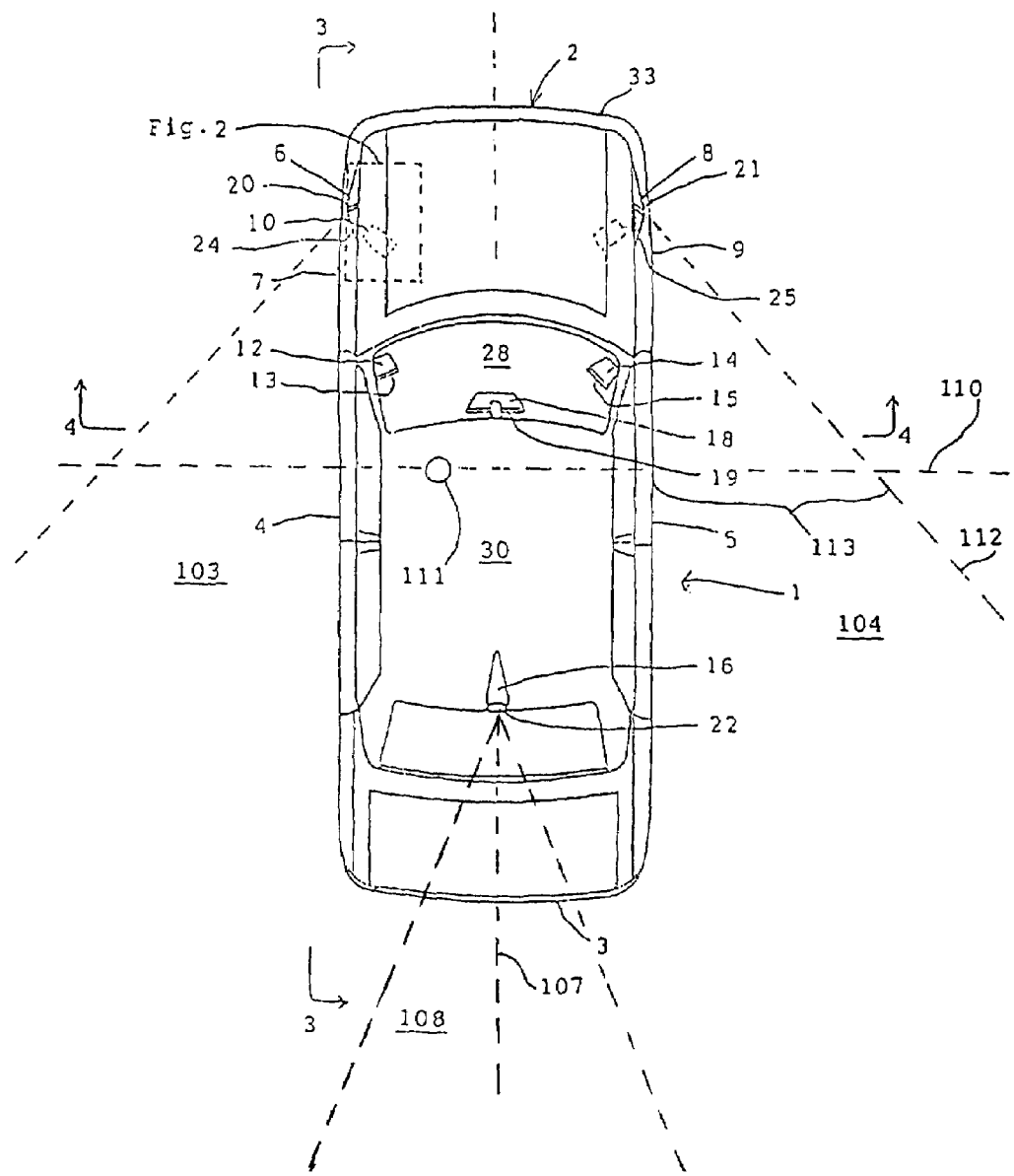
FIG. 1 is a top view of a vehicle equipped with the rear view monitoring system of the present invention, and includes a diagrammatic representation of viewing areas relative to the vehicle.

Referring now to FIGS. 1–4, there is shown a passenger vehicle 1 having front portion 2 terminating in bumper 33, rear portion 3, left side portion 4 and right side portion 5. Said vehicle, having a center axis of elongation 107, further comprises a passenger compartment 30 bounded in part by said front and rear, left side and right side portions, and roof 26. Upwardly directed pillars 27 support said roof, and are located at four sites about the perimeter of said compartment in a rectangular array. A windshield 28 generally encloses the front of the compartment, extending upwardly from a dashboard 29 to roof 26.

A first, left video assembly 6 is installed within the left front fender 7 of the car, and a second, right video assembly 8 is installed within right front fender 9. The contour of assemblies 6 and 8 are styled to blend harmoniously with fenders 7 and 9, respectively.

Figure 2:
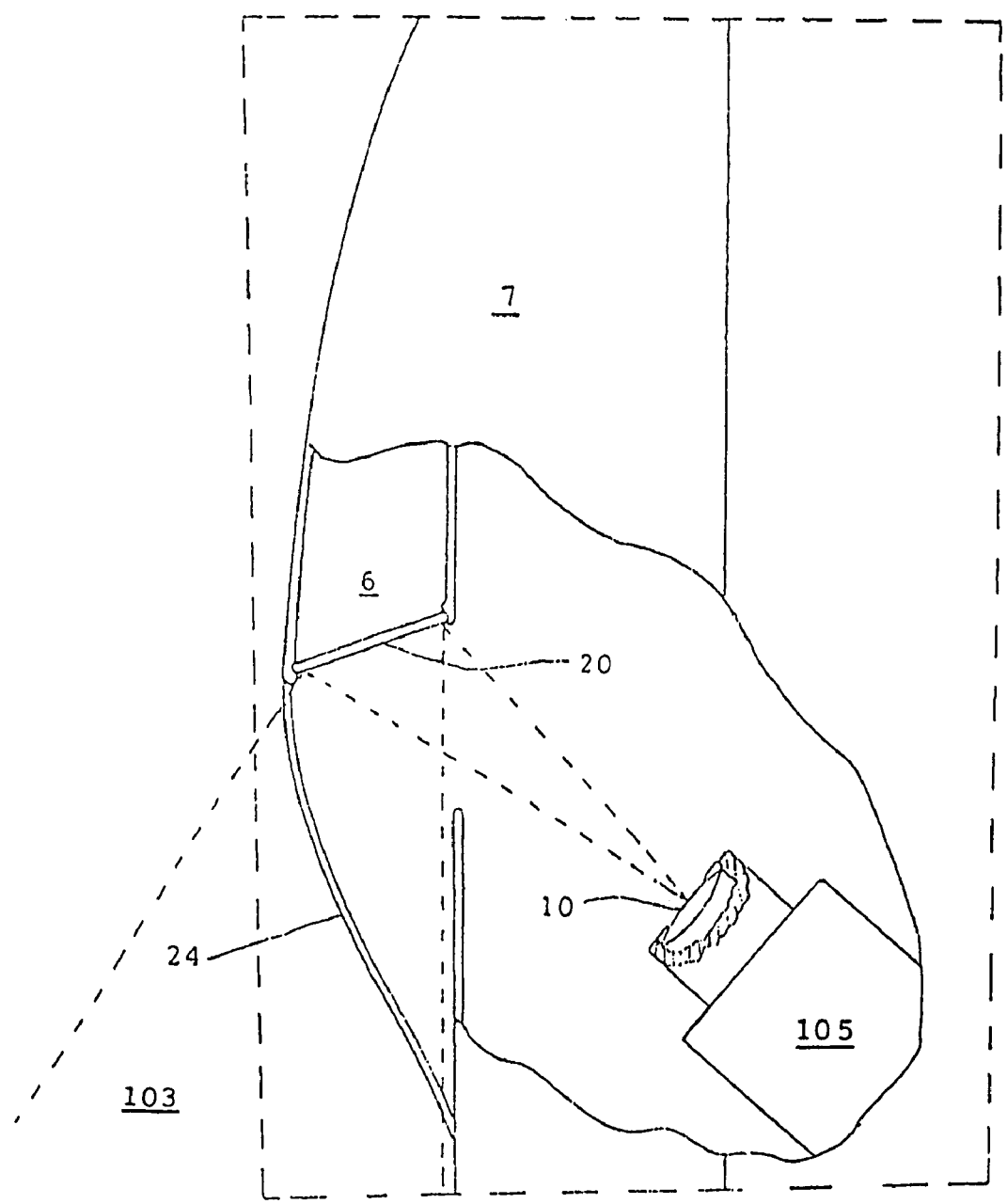
FIG. 2 is a magnified top view, partly in section, of the area enclosed by broken lines marked "FIG. 2" of FIG. 1, showing schematic details of a video assembly employed in the present invention.
Figure 8:
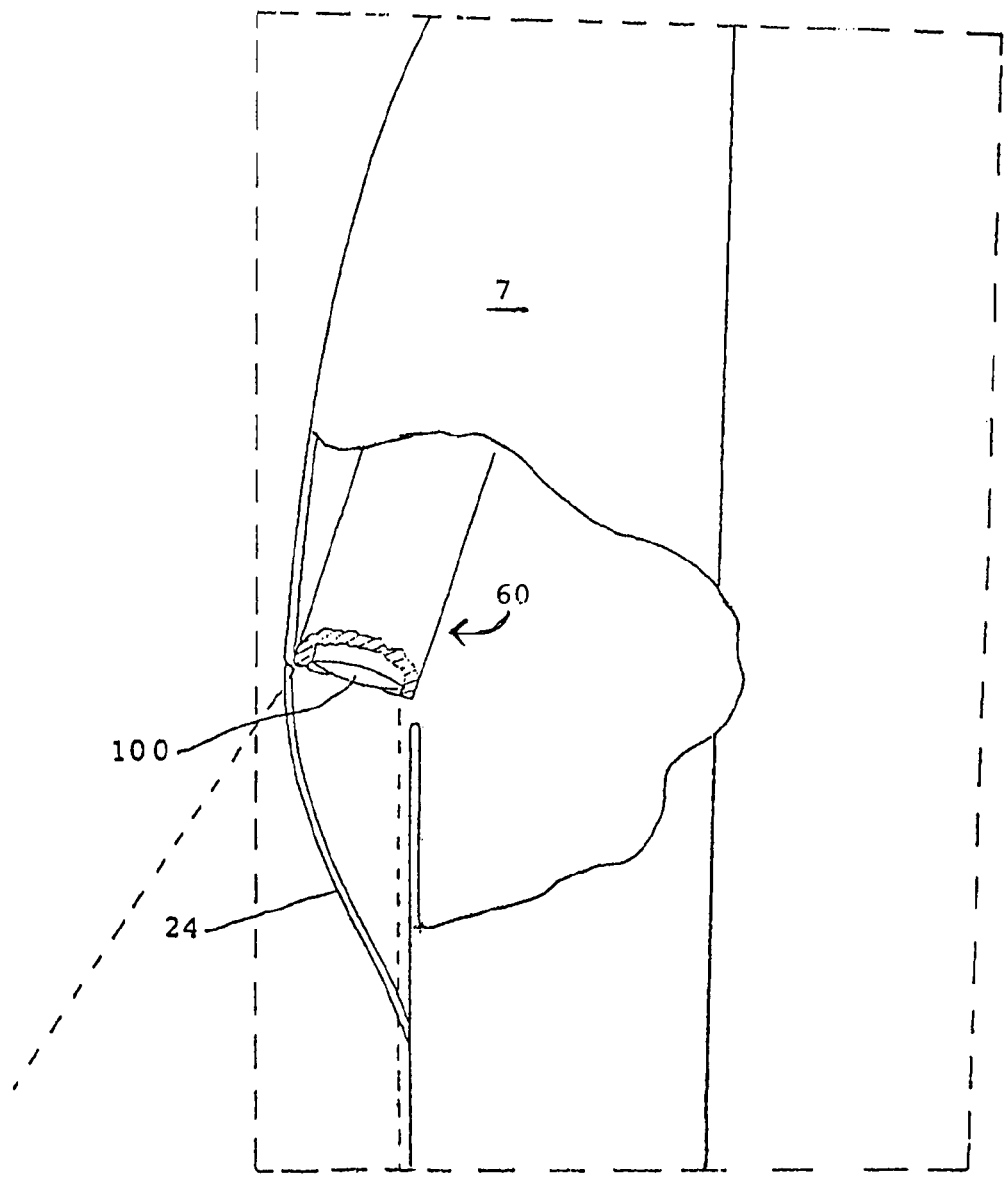
FIG. 8 is a magnified top view, partly in section, of an area similar to that shown in FIG. 2, showing details of a first alternative embodiment of the video assembly employed in the present invention.
Figure 9:
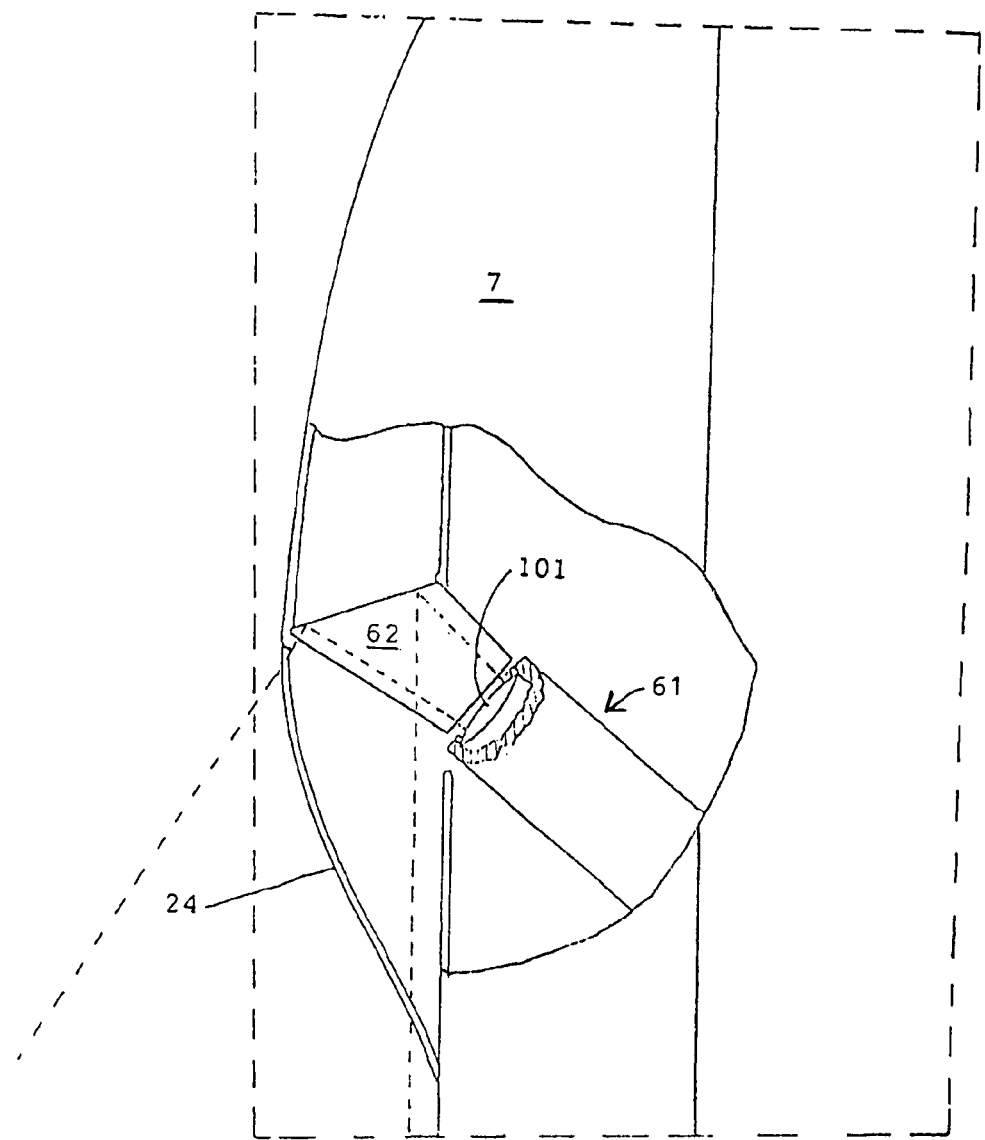
FIG. 9 is a magnified top view, partly in section, of an area similar to that shown in FIG. 2, showing details of a second alternative embodiment of the video assembly employed in the present invention.

Each video assembly is comprised of an optical lens 10 capable of gathering light at a particular viewing angle to produce a focused image, and a camera body 105 which converts said image into an electronic signal amenable to alteration and transmission by electronic means. Image reversal means are also associated with each video assembly. In a first embodiment of image reversal means, as shown in FIGS. 2 and 9, a mirror 20 or equivalent prism 62 is disposed directly in front of the lens and thereby reflects a mirror image into the lens. In such embodiment, the mirror or prism is directed toward the rear of the vehicle. In a second embodiment of image reversal means, as shown in FIG. 8, instead of employing a mirror or prism, the camera body achieves reversal of the image by electronic means. Because said mirror-dependent first embodiment allows greater adaptability of placement in the vehicle, its use is emphasized in this disclosure.

Left rear view mirror 20 is positioned to reflect an image of rearwardly monitored area 103 at the left of the vehicle into associated video lens 10. Right rear view mirror 21 is similarly positioned to reflect an image of rearwardly monitored area 104 at the right of the vehicle into the lens component of right video assembly 8. Mirrors 20 and 21 are of substantially rectangular shape, and may be flat or convex, but are identical with respect to viewing angle and consequent magnification effect.

Video assemblies 6 and 8 may be miniaturized so that mirrors 20 and 21 are each reduced to about an inch or less in diameter, and are placed in close enough proximity to the associated lenses to enable the lens to function at its full viewing potential. Thus, miniaturization allows mirrors 20 and 21 to be designed in a manner that will blend maximally with the external contour of the vehicle and be as inconspicuous as possible. It is intended that no component of the video assembly will protrude more than 2 inches away from the vehicle. Contoured, scratch-resistant, optically neutral, easily replaceable lens covers 24 and 25 may be provided for improved styling and protective maintenance.

Left video assembly 6 continuously converts the captured image into electronic data. Said data is transmitted through suitable electrical circuitry to left monitor assembly 12 where it is continuously converted back into a visual picture which is displayed on monitor screen 13. Since the image captured by left video lens 10 is actually a mirror image of the area to the left and rear of the vehicle as reflected by left rear view mirror 20, the image produced on monitor screen 13 is also a mirror image.

Right video assembly 8 likewise continuously translates the image captured by its lens into electronic data which is electronically transmitted to right monitor assembly 14. Said data is continuously converted back into a visual display picture on right monitor screen 15. Since the image captured by the right video lens is a mirror image as reflected by right rear view mirror 21, the visual picture displayed on right monitor screen 15 is also a mirror image.

Third video assembly 16 is installed in a location at the rear of the vehicle, preferably directly above center axis 107. It houses a rearward facing central rear view mirror 22 for reflecting an image of monitored area 108 rearwardly of the vehicle into the lens of the video assembly. Said image is processed into an electronic signal which is transmitted to central monitor screen 19 and there converted into a corresponding easily viewed picture. Rear video assembly 16 may be miniaturized to achieve the styling advantages already described, and may be provided with a lens cover as well. Alternatively, said third video assembly may be housed entirely within the vehicle.

The lenses of the video assemblies are preferably designed to embrace viewing angles between 35 and 46 degrees so that they can cover large areas of surveillance while still producing images of adequate size. The rear view monitoring system of this invention is amenable to adjustability of viewing angles and/or image magnification. Such adjustability can be met through proper selection of lenses. For example, a lens of 50 mm. focal length has a viewing angle of 46 degrees, and a lens of 75 mm. focal length has a viewing angle of about 35 degrees. The use of zoom lenses could provide adjustable viewing angles. Adjustment controls may be located on the dashboard within convenient reach of the driver. It is preferred, however that the three video assemblies provide the same degree of image magnification, and in this connection it should be noted that image magnification is determined by the viewing angle or focal length of the lens. In particular, shorter focal length lenses, with their attendant wide viewing angle produce smaller images.

The monitoring system of this invention can provide a controlled amount of overlap between the view seen at the center screen and the views seen at the side screen. Such overlap provides continuity of imagery as traffic flows from the field of view of one monitor to that of the other. It is preferred that such overlap be between 5 and 20 percent of the image area at both lateral extremities 116 of central monitor screen 19.

One important aspect of this invention is that the video assemblies 6 and 8 are positioned as far forward on the vehicle as practicable, such as in the illustrated locations far forward on the front fenders. By locating these side imaging units forwardly, a smaller viewing angle is needed to achieve satisfactory coverage of the "blind spots." Proper forward positioning of the first and second, side imaging video assemblies enables them to cover desired areas 103 and 104 employing a viewing angle that matches the viewing of the third video assembly. Such matching will cause the pictures on the three screens to be of equal magnification without need for electronic adjustment. Such location of video assemblies 6 and 8 is preferably at a site between 65% and 80% of the distance measured from windshield 28 toward bumper 33.

Figure 6:
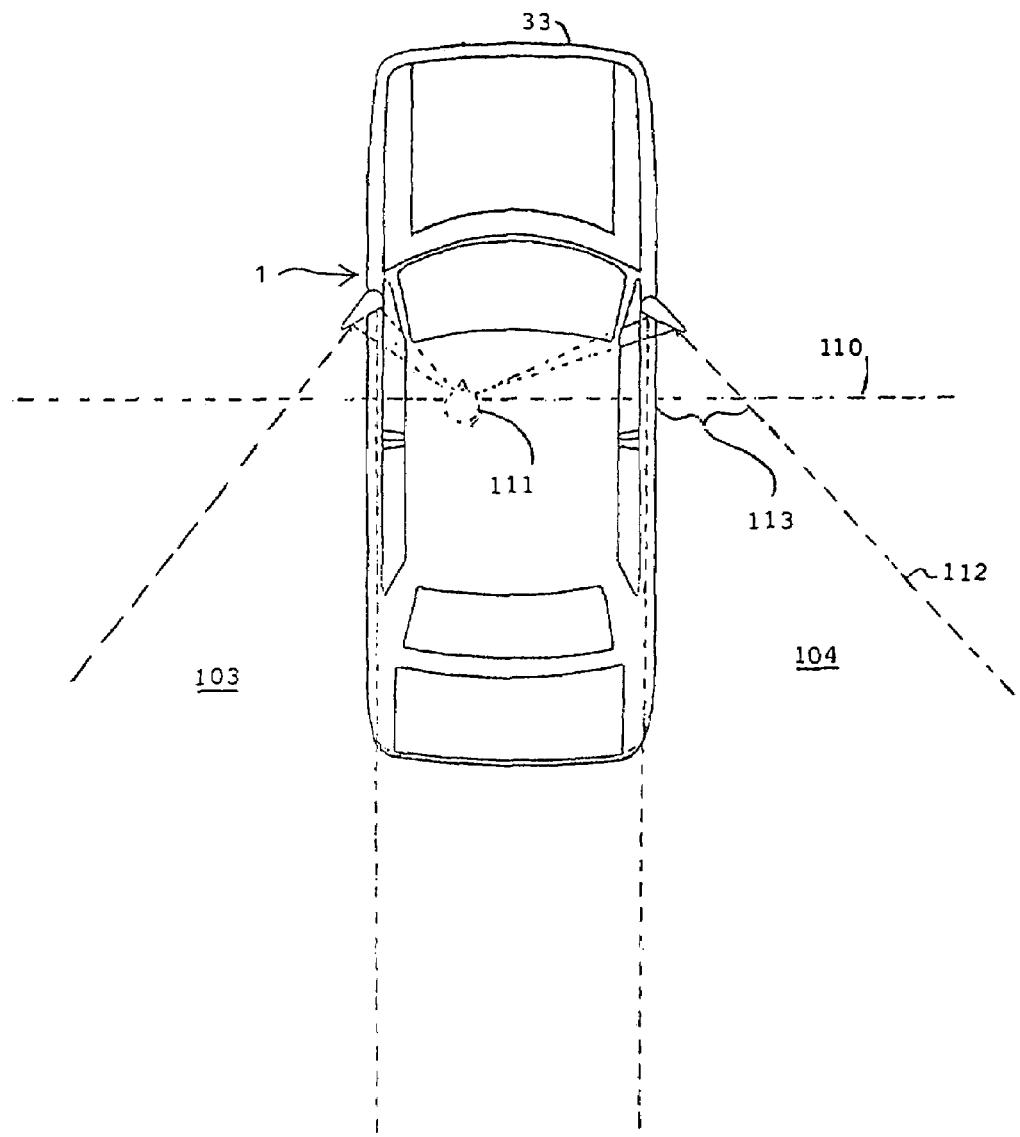
FIG. 6 is a top view of a vehicle equipped with a rear view mirror system of the prior art, and further shows associated viewing areas.

The effect of the forward placement of the first and second video assemblies is best seen by comparing FIG. 1 with FIG. 6 which shows a typical rear view mirror arrangement of the prior art. In each case, the viewing angle provided by the mirror or video assembly is shown at 42 degrees as bounded by the side of the vehicle and the broken straight diagonal line 112. A lateral line of sight, shown as broken line 110, is centered upon the head of the driver 111. By comparing the distance 113, shown bracketed, between the side of the vehicle and diagonal line 112 for each case, it is seen that such distance, which is essentially an effective field of view, is at least 50% greater by virtue of the forward placement of the video assemblies.

Figure 4:
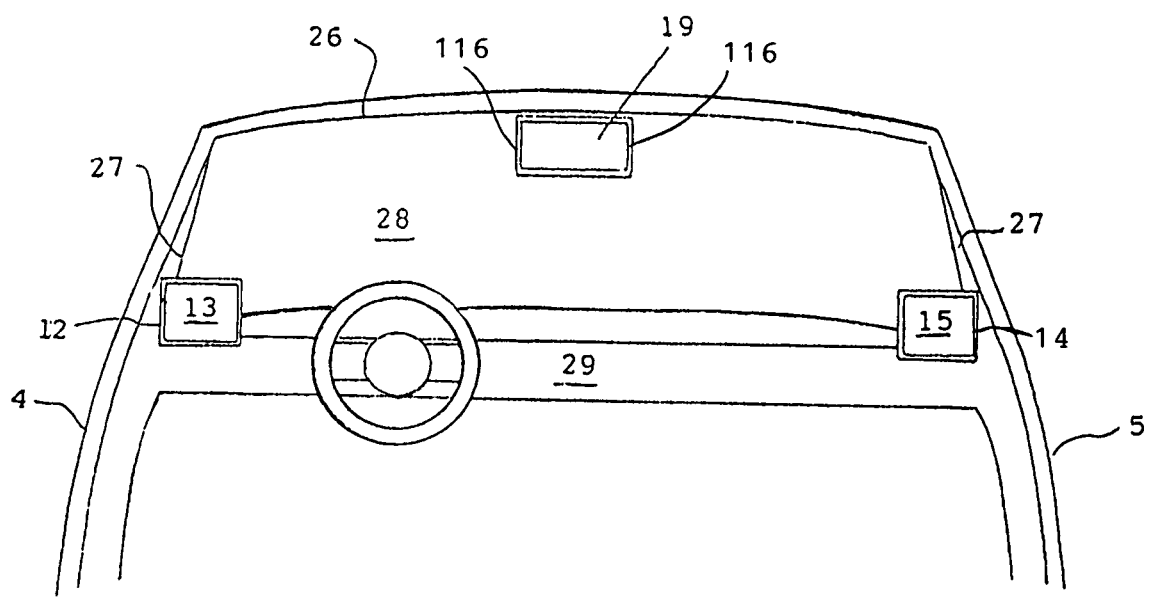
FIG. 4 is an enlarged fragmentary sectional view taken in the direction of the arrows upon line 4—4 of FIG. 1.

Monitor screens 13, 15 and 19 are preferably equipped with means for controlling contrast, brightness and possibly size of the displayed images, with conveniently located control knobs. The left and right monitor screens 13 and 15 are best located on the dashboard near the left and right roof-supporting pillars 27 so that they will be in the approximate area where the driver would ordinarily look as a matter of habit and experience to check the rear view. For the same reason, central monitor screen 19 is best centered high behind windshield 28 where the inside rear view mirror is usually located, as shown in FIG. 4.

Figure 3:
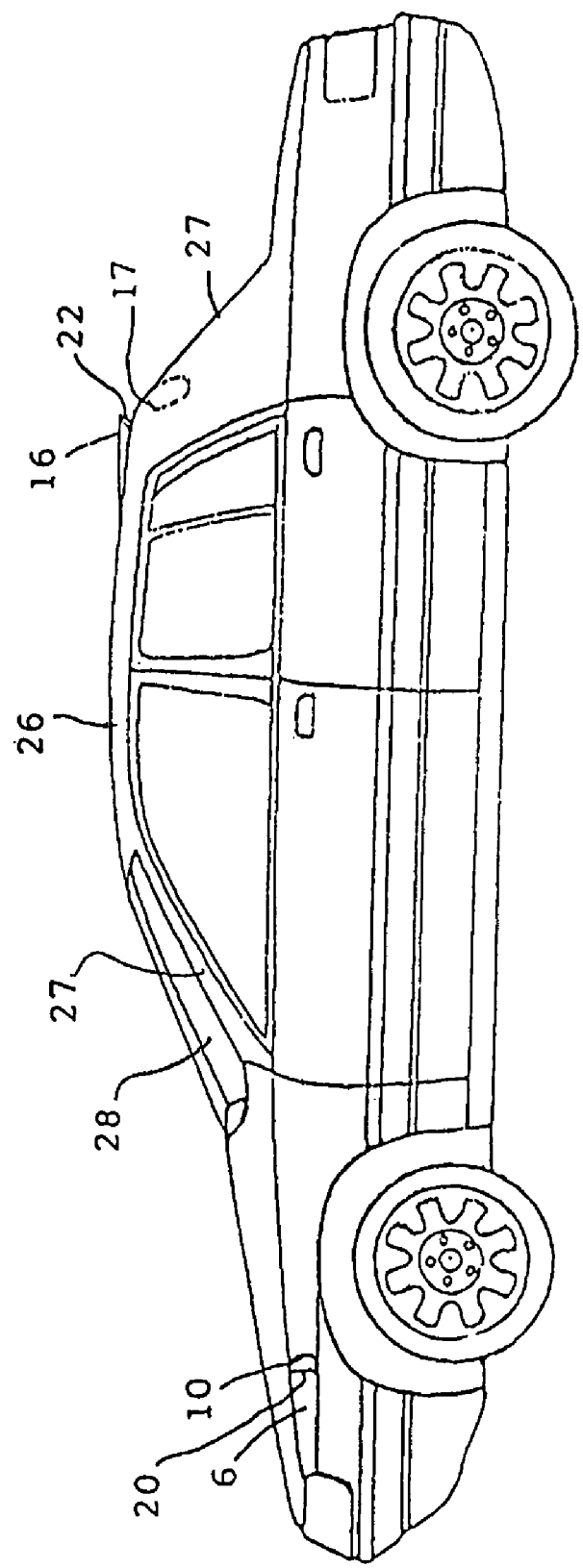
FIG. 3 is a side view taken in the direction of the arrows upon line 3—3 of FIG. 1.
Figure 5:
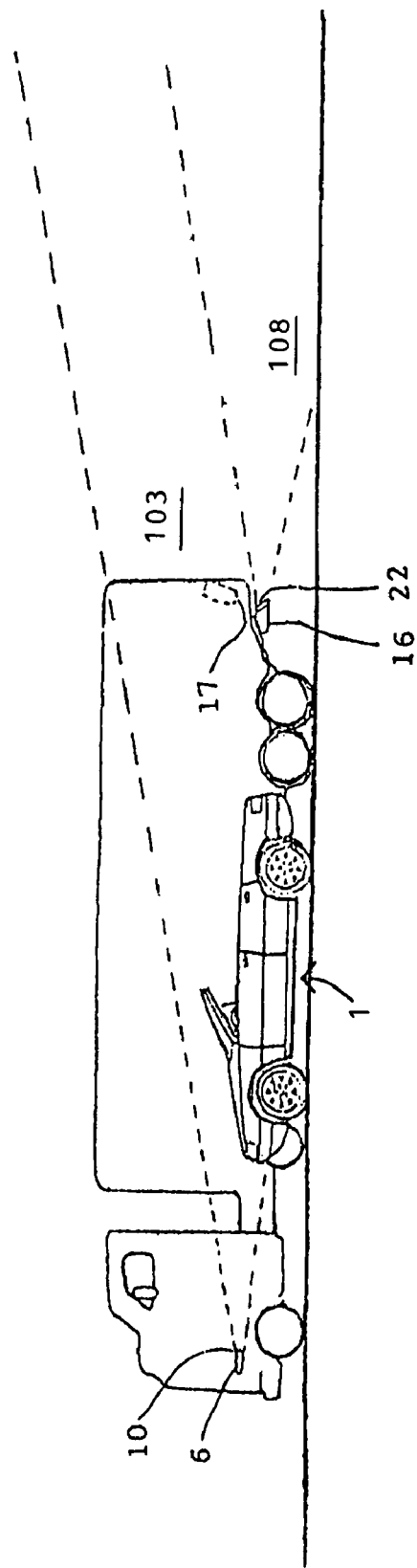
FIG. 5 is a side view of a large truck equipped with the rear view monitoring system of the present invention, and further showing the associated viewing areas.
Figure 7:
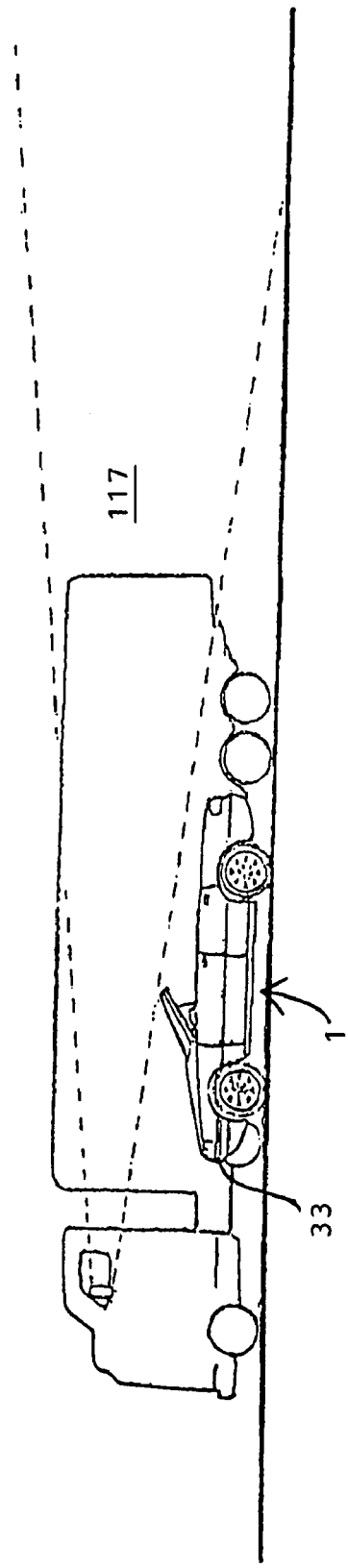
FIG. 7 is a side view of a truck equipped with a rear view mirror system of the prior art, and further shows the consequent viewing area.

The preferred location of mirrors 20 and 21 when used on trucks, having a compartment or "cab" situated in a high position such as above the engine, would be similar to those for cars, i.e. on the front fenders. This has the advantage of visualizing low silhouette vehicles which are otherwise difficult to see with high mounted rear view mirrors, as previously described. This is illustrated by the high viewing area 117 achieved by prior truck side mirror systems, as shown in FIG. 7. Such high viewing area fails to embrace vehicle 1 alongside the truck. Suitable locations for the rear video assembly 16 for cars and trucks are shown in FIGS. 1 and 3, and in FIG. 5, respectively.

To illustrate the use of an alternative embodiment of video assembly, there is shown in FIG. 8 a video assembly 60 disposed in left front fender 7, equipped with lens 100 directed rearwardly and to the left in order to capture a suitable view of area 103 to the left and rear of the vehicle. The image captured by lens 100 is electronically processed into its mirror image and electronically transmitted to left monitor assembly 12 where it is displayed as the mirror image of the observed area. A similar video assembly is disposed in the right front fender.

Another embodiment of video assembly is shown in FIG. 9 where left video assembly 61 is disposed in the left front fender 7 of the vehicle. Reflecting prism 62 is positioned to reflect a mirror image of area 103 to the left and rear of the vehicle. This image is captured by lens 101 of video assembly 61 and is processed into electronic signals that are transmitted to left monitor assembly 12 where it is displayed as a mirror image of the observed area. A similar video assembly is disposed in the right front fender.

When properly installed and adjusted, the rear view video assemblies of this invention serve more effectively than current rear view mirrors and may therefore be used in their place. The rear view monitoring system of this invention provides the driver with substantially complete imagery of significant areas to the side and rear of his vehicle. The provided images are of equal, non-distorted optical characteristics and can be modified with respect to brightness and contrast. The functionality of the system is unaffected by deposits of fog, rain or snow on the vehicle's windows. The interior placement of components of the system enhances the appearance and streamlining of the vehicle. Furthermore, the system does not require adjustment to accommodate drivers of different heights.

Although the preferred embodiment is described in great detail it is to be understood that various changes and modifications may be made therein without departing from the true spirit and scope of the invention which is more fully described in the appended claims.

Having thus described my invention, what is claimed is:

1. A rear view monitoring system for a motor vehicle having a longitudinal center axis and passenger compartment symmetrically centered upon said axis and bounded by front and rear, left side and right side portions of the vehicle, a front windshield, a roof, and upwardly directed roof-supporting pillars, said monitoring system comprising:

a) first and second rear view side video assemblies installable on opposite sides of the front portion of said vehicle and positioned and configured to produce mirror images of rearward areas contiguous to the left and right sides of the vehicle, respectively, b) a third video assembly installable upon the rear of said vehicle and configured to produce a mirror image of an area behind said vehicle, and c) first, second and third monitor screens of substantially rectangular contour located within said compartment and separately interactive with said first, second and third video assemblies, respectively, to provide visually observable pictures corresponding to said mirror images, said first and second screens being positioned adjacent pillars on the same side of the compartment as the associated video assemblies, and said third screen being centered high upon said front windshield said pictures being of substantially equal magnification and wherein the pictures on said first and second screens partially and adjustably overlap the picture on said third screen, the nature of said overlap being such that between 5% and 20% of the picture on said third screen, measured inwardly from the opposite lateral extremities thereof repeats those portions of pictures on said other two screens which are closest to said axis.

2. The monitoring system of claim 1 wherein said video assemblies are comprised of an optical lens capable of gathering light at a particular viewing angle to produce a focused image, a camera body capable of converting said image to an electronic signal amenable to alteration and transmission via electrical conductors, and means for reversing said image to produce a mirror image.

3. The monitoring device of claim 2 wherein said image reversing means is a rearwardly directed mirror positioned in front of said lens which is forwardly directed.

4. The monitoring system of claim 2 wherein said image reversing means is electronic circuitry within said camera body, and said lens is rearwardly directed.

5. The monitoring system of claim 2 wherein said lens is of adjustable zoom construction.

6. The monitoring device of claim 2 wherein said image reversing means is an optical prism positioned in front of said lens which is forwardly directed.

7. The monitoring system of claims 1 wherein the front portion of said vehicle terminates forwardly in a front bumper, and further comprises oppositely paired fenders.

8. The monitoring system of claim 7 wherein said first and second video assemblies are installed at opposite locations within said paired fenders with minimal outward protrusion from said fenders.

9. The monitoring system of claim 8 wherein the locations of said first and second video assemblies are selected such that the requisite viewing angles to properly cover areas contiguous to the sides of the vehicle match the viewing angle of said third video assembly, thereby causing said screens to show pictures of equal magnification.

10. The monitoring system of claim 7 wherein said first and second video assemblies are located at sites between 65% and 80% of the distance measured from said windshield toward said bumper.

11. The monitoring device of claim 10 wherein the viewing angle of said optical lens is between 35 and 46 degrees.

12. The monitoring device of claim 11 wherein no portion of said video assemblies protrudes more than 2 inches outwardly from the vehicle.

* * * * *